United States Patent [19]

Bolton et al.

[11] Patent Number: 5,202,847

[45] Date of Patent: Apr. 13, 1993

[54] DIGITAL SIGNAL PROCESSING

[75] Inventors: Martin J. Bolton, Bristol; Kenneth N. Burgin, Stonehouse, both of United Kingdom

[73] Assignee: Inmos Limited, Bristol, England

[21] Appl. No.: 560,114

[22] Filed: Jul. 31, 1990

[51] Int. Cl.$^5$ ............................................. G06F 15/332
[52] U.S. Cl. ............................................. 364/725
[58] Field of Search ..................................... 364/725–726

[56] References Cited

U.S. PATENT DOCUMENTS

| | | | |
|---|---|---|---|
| 4,601,006 | 7/1986 | Liu | 364/726 |
| 4,675,836 | 6/1987 | Arnould et al. | 364/725 |
| 4,821,224 | 4/1989 | Liu et al. | 364/726 |
| 5,034,910 | 7/1991 | Whelchel et al. | 364/726 |
| 5,038,311 | 8/1991 | Monastra et al. | 364/726 |

OTHER PUBLICATIONS

Stanley A. White, "Applications of Distributed Arithmetic to Digital Signal Processing: A Tutorial Review" IEEE ASSP Magazine, Jul. 1989, pp. 7–19.

*Primary Examiner*—Tan V. Mai
*Attorney, Agent, or Firm*—Edward D. Manzo; John J. King

[57] ABSTRACT

Digital signal processing circuitry for calculating separable two dimensional linear transforms on blocks of data elements includes two processors coupled as a linear pipeline. Each processor carries out a one dimensional linear transform effecting multiplication of transform coefficients by repeated addition in a carry save adder network to form a plurality of inner products. The two processors may effect simultaneously different transforms on respective blocks of data.

13 Claims, 8 Drawing Sheets

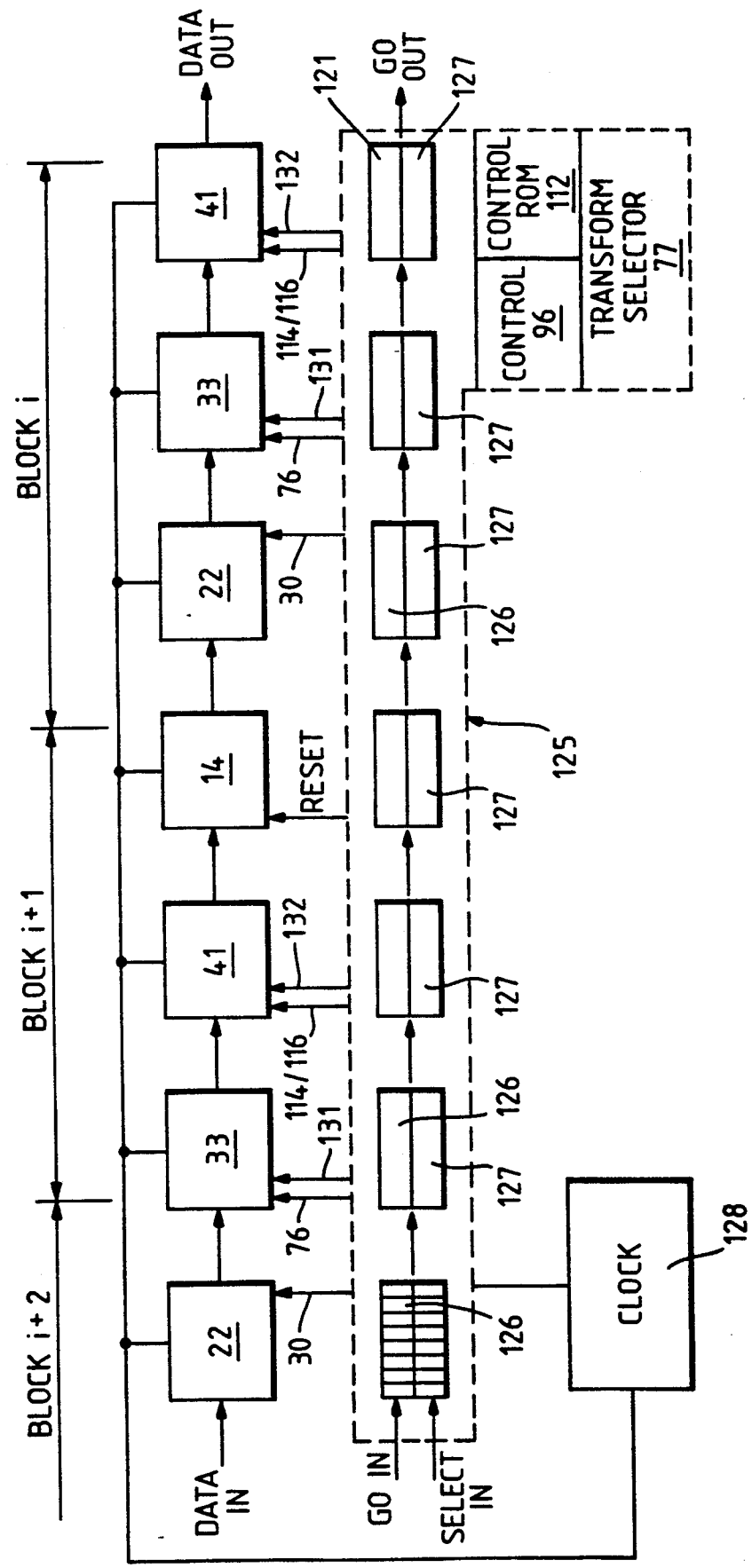

DIGITAL SIGNAL PROCESSING

The present invention relates to digital signal processing and particularly to apparatus and methods for use in computing separable two dimensional linear transforms on blocks of digital data elements.

BACKGROUND OF THE INVENTION

It is known to calculate separable two dimensional linear transforms on blocks of data elements for various purposes in digital signal processing. Such transforms may include discrete cosine transform (DCT) inverse discrete cosine transform, a low pass filter and identity. Discrete cosine transforms are particularly useful in image compression systems and may be used to limit the amount of data necessary for transmission and storage of video signals. The above mentioned transforms may be used to meet requirements of the CCITT Video Codec standard.

It is the object of the present invention to provide improved apparatus and methods for computing separable two dimensional linear transforms with improved circuitry which may permit more than one type of transform to be carried out on data passing through the circuitry. It is a further object of the invention to provide improved circuitry requiring a reduced number of transistors thereby providing benefits in the chip area required, cost and power dissipation.

SUMMARY OF THE INVENTION

The invention provides digital signal processing circuitry comprising a first and second processor each for effecting a linear transform on respective blocks of digital data, said first and second processors being coupled as a linear pipeline having timing control circuit whereby a succession of blocks of digital data may be processed by each of said first and second processors in succession, each of said first and second processors being arranged to effect one of a selection of different linear transforms and each including selection circuitry independently operable of the other processor whereby said first and second processors may effect simultaneously different transforms on respective blocks of data.

The invention also provides a method of computing linear transforms on blocks of digital data, said method comprising transmitting data successively through first and second processors each arranged to carry out a linear transform, controlling flow of data through said first and second processors in a time controlled manner to effect a linear pipeline, selecting a first set of coefficients for use in said first processor, selecting a second set of coefficients for use in the second processor and transmitting blocks of data successively through the two processors whereby different transforms may be carried out simultaneouly by the first and second processors on respective blocks of data.

Preferably each processor includes a bank of carry save adders to effect multiplication of transform coefficients by repeated addition to form a plurality of inner products, each addition corresponding to one bit position of a data word in said blocks of data.

Preferably sum and carry signals from said bank of carry save adders are resolved by a carry propagate adder before data is supplied to the second processor.

In a preferred embodiment said first and second processors comprise substantially the same circuitry.

Preferably the inner product computation is effected by distributed arithmetic techniques.

Preferably each bank of adders operates in 2's complement format and inverter circuitry is provided to invert data supplied to the adder corresponding to the most significant bits of data supplied from each word.

Preferably the inversion is effected by one or more cross-over switches used to interchange the connection of a pair of lines to an array of adders forming a succession of addition stages, the or each cross-over switch connecting a pair of lines to adders in successive stages and interchanging the connection of the two lines on operation of the switch.

In a preferred embodiment the digital signal processing circuitry is implemented in CMOS.

Preferably said circuitry is arranged to effect two dimensional separable transforms.

Preferably the transform is effected as two successive one dimensional transforms.

Preferably the invention is arranged to effect a discrete cosine transform. The invention may also be arranged to provide an inverse discrete cosine transform, a low pass filter and identity transform.

BRIEF DESCRIPTION OF THE DRAWINGS

FIG. 10 shows a pipeline control arrangement for the apparatus of FIG. 3.

DESCRIPTION OF THE PREFERRED EMBODIMENT

Figure 1:
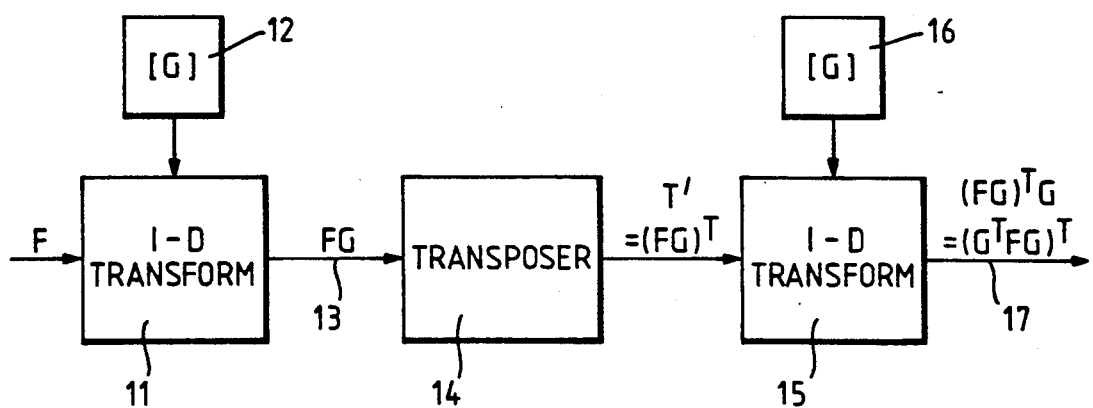
FIG. 1 is a schematic view of the system used to compute a separable two dimensional linear transform.

The embodiment of the invention which is shown in the drawings is arranged to compute separable two dimensional linear transforms on 8×8 blocks of 16 bit data elements. Processing of contiguous blocks is continuous and the transform coefficients are programmed in a ROM. The apparatus of this example may carry out four different transforms which are discrete cosine transform, inverse discrete cosine transform, a low pass filter and identity.

Separable 2-D Linear Transforms

A one dimensional linear transform, which transforms $N \times 1$ vector f into $N \times 1$ vector T, is defined as $$T = Gf$$

or $$T(u) = \sum_{x=0}^{N-1} f(x)g(u,x), \; u = 0, 1, \ldots, (N-1)$$

G is the forward transform kernel. In matrix form, the 1-D transform can be written as $$\begin{bmatrix} T(0) \\ \vdots \\ T(N-1) \end{bmatrix} = \begin{bmatrix} g(0,0) & \cdots & g(0,N-1) \\ \vdots & \vdots & \vdots \\ g(N-1,0) & \cdots & g(N-1,N-1) \end{bmatrix} \begin{bmatrix} f(0) \\ \vdots \\ f(N-1) \end{bmatrix}$$

This transform can be viewed as N inner products, each of which requires N multiplications and N−1 additions.

The inverse transform, which transforms vector T back into f, is $$f(x) = \sum_{u=0}^{N-1} T(u)h(x,u), \; x = 0, 1, \ldots, (N-1)$$

or
$$f = HT$$

where H is the inverse transform kernel.

A two dimensional linear transform maps an N×N array into another N×N array. A 2-D forward transform is defined as $$T(u,v) = \sum_{x=0}^{N-1} \sum_{y=0}^{N-1} f(x,y)g(u,v,x,y), \; u,v = 0,1,\ldots,(N-1)$$

and the inverse transform is $$f(x,y) = \sum_{u=0}^{N-1} \sum_{v=0}^{N-1} T(u,v)h(x,y,u,v), \; x,y = 0,1,\ldots,(N-1).$$

The forward kernel is separable if $$g(u,v,x,y) = g_1(u,x) g_2(v,y), \; u,v,x,y = 0,1,\ldots,(N-1)$$

and symmetric if $$g(u,v,x,y) = g_1(u,x) g_1(y,v), \; u,v,x,y = 0,1,\ldots,(N-1)$$

The same applies to the reverse kernel. Separable transforms can be performed in two steps, each of which is a 1-D transform. First the rows of the input array are transformed:

$$T(x,v) = \sum_{y=0}^{N-1} f(x,y) g_2(y,v), \; x,v = 0,1,\ldots,(N-1)$$

or
$$T = FG_2$$

then the columns $$T(u,v) = \sum_{x=0}^{N-1} g_1(u,x)T(x,v), \; u,v = 0,1,\ldots,(N-1)$$

or
$$T = G_1^T T$$

or

If $G_1 = G_2 = G$ (as is the case with the DCT), then $$T = G^T F G$$

The discrete Cosine Transform (DCT)

A special case of the above is the discrete cosine transform and its inverse. The 2-D DCT of the array of data points y(m,n), M=0, 1, ..., (M−1), n=0, 1, ..., (N−1) is $$Y(j,k) =$$

$$\frac{4}{MN} E_j E_k \sum_{m=0}^{M-1} \sum_{n=0}^{N-1} y(m,n) \cos\frac{(2m+1)j\pi}{2M} \cos\frac{(2n+1)k\pi}{2N},$$

$$j = 0,1,\ldots,(M-1) \; k = 0,1,\ldots,(N-1)$$
where $$E_j, E_k = \begin{cases} \frac{1}{\sqrt{2}} & j = k = 0 \\ 1 & \text{otherwise} \end{cases}$$

The transform is obviously separable, and if M=N, it is symmetric and can be expressed as two 1-D transforms. Thus the DCT of a data sequence x(n), n=0, 1, ..., (N−1) is defined as $$G_x(0) = \frac{\sqrt{2}}{N} \sum_{n=0}^{N-1} x(n)$$

$$G_x(k) = \frac{2}{N} \sum_{n=0}^{N-1} x(n)\cos\frac{(2n+1)k\pi}{2N}, \; k = 1,2,\ldots,(N-1)$$

where $G_x(k)$ is the kth DCT coefficient.

For example, if N=4, the DCT computation can be written as $$\begin{bmatrix} G_x(0) \\ G_x(1) \\ G_x(2) \\ G_x(3) \end{bmatrix} = \frac{1}{2} \begin{bmatrix} \frac{1}{\sqrt{2}} & \frac{1}{\sqrt{2}} & \frac{1}{\sqrt{2}} & \frac{1}{\sqrt{2}} \\ \cos\frac{\pi}{8} & \cos\frac{3\pi}{8} & \cos\frac{5\pi}{8} & \cos\frac{7\pi}{8} \\ \cos\frac{\pi}{4} & \cos\frac{3\pi}{4} & \cos\frac{5\pi}{4} & \cos\frac{7\pi}{4} \\ \cos\frac{3\pi}{8} & \cos\frac{9\pi}{8} & \cos\frac{15\pi}{8} & \cos\frac{21\pi}{8} \end{bmatrix} \begin{bmatrix} x(0) \\ x(1) \\ x(2) \\ x(3) \end{bmatrix}$$

The inverse DCT is defined as $$X(n) = \frac{1}{\sqrt{2}} G_x(0) + \sum_{k=1}^{N-1} G_x(k)\cos\frac{(2n+1)k\pi}{2N},$$

$$n = 0,1,\ldots,(N-1)$$

This example comprises CMOS circuitry for implementing transforms of the above type. As the transforms are separable, they are carried out as two successive one dimensional transforms. In FIG. 1 a first one dimensional transform is carried out in a processor 11 on a matrix or block F in accordance with coefficients G stored in a ROM 12. The output 13 of the first transformation must be transposed in a transposer 14 so that rows become columns and vice versa. This is necessary as the inputs to the processor 11 enter row by row but the outputs are formed column by column. The second transformation is carried out by processor 15 in accordance with coefficients stored in a further ROM 16. This leads to an output 17 which again requires transposition of rows for columns. In this way the two dimensional transform is effected as two successive one dimensional transforms. Each of the transforms requires performance of all the multiplications and additions of the matrix elements. The same structure used to implement the arrangement in FIG. 1 can be used for any transform of the same size. It is merely necessary to select the correct coefficients in the ROMs 12 and 16. The multiplications and additions needed are implemented in this example by use of distributed arithmetic which is a method of computing inner products of two N-bit vectors one of which is a constant coefficient vector. This method of computing using distributed arithmetic is known and described in an article by S.A. White "Applications of distributed arithmetic to digital signal processing: a tutorial review" IEEE ASSP Magazine July 1989 pages 4–19. The contents of that article are incorporated herein by cross-reference.

Figure 2:
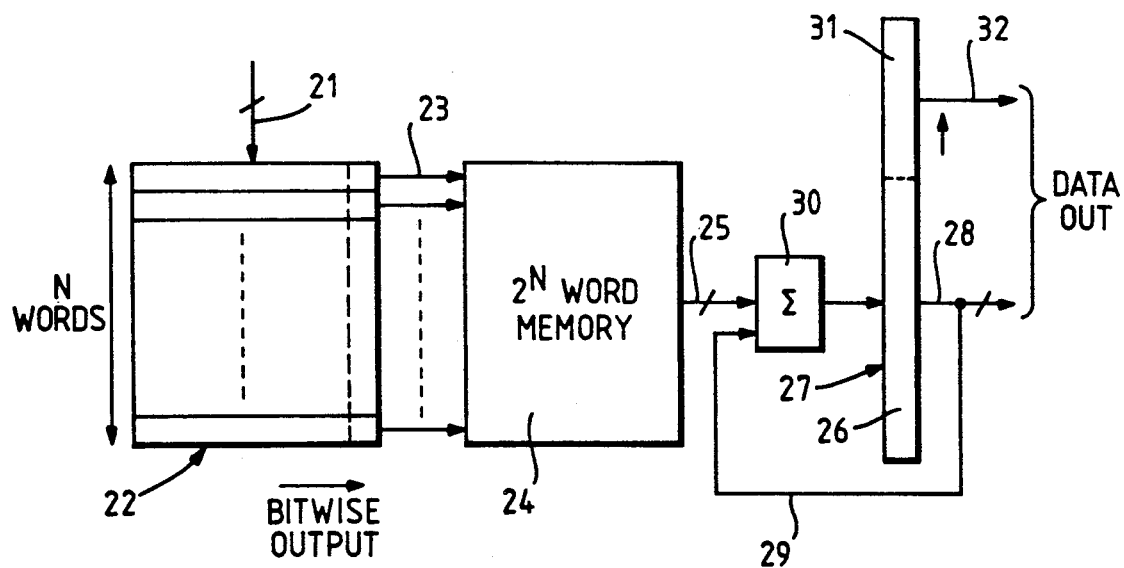
FIG. 2 is a block diagram of the system used to compute an inner product in accordance with FIG. 1.

The method of computing an N-bit inner product using distributed arithmetic is shown in FIG. 2.

Data representing one row or column of the matrix F consists of eight 16 bit words which are supplied on a bus 21 to a stack of registers or memory 22 which act as a corner turning device. Each word is loaded in parallel into a respective register and the bits of all the registers are then shifted out in bit wise manner on outputs 23 forming an address for use in a $2^N$ word memory 24. In accordance with known distributed arithmetic techniques, the memory 24 contains precomputed combinations of the transform coefficients depending on the type of transform which is to be effected. As the contents of the registers 22 are shifted out in bit wise manner the memory 24 is successively addressed at different locations and the output of the memory is formed on bus 25 and added into the most significant part 26 of an accumulator 27 which performs a right shift (that is to positions of lower significance) between additions. As shown in FIG. 2, an output from part 26 is provided on line 28 which is fed back through line 29 to a summing device 30 which combines the new output 25 from the memory 24 with the existing contents of part 26 of the accumulator 27. As shown in FIG. 2 the least significant part of the accumulator 27 is indicated at 31 and provides a separate output 32. The number of addition cycles required is equal to the number of bits in the input words on bus 21. A complete one dimensional transform requires N inner product units of the type shown in FIG. 2 each of which will have a different memory 24 with combinations of another N transform coefficients. An N×N separable transform will require 2N units of the type shown in FIG. 2. After the required number of addition cycles by each inner product unit of the type shown in FIG. 2 the combined outputs 28 and 32 of each of the inner product units will provide the transform output 13 shown in FIG. 1.

Figure 3:
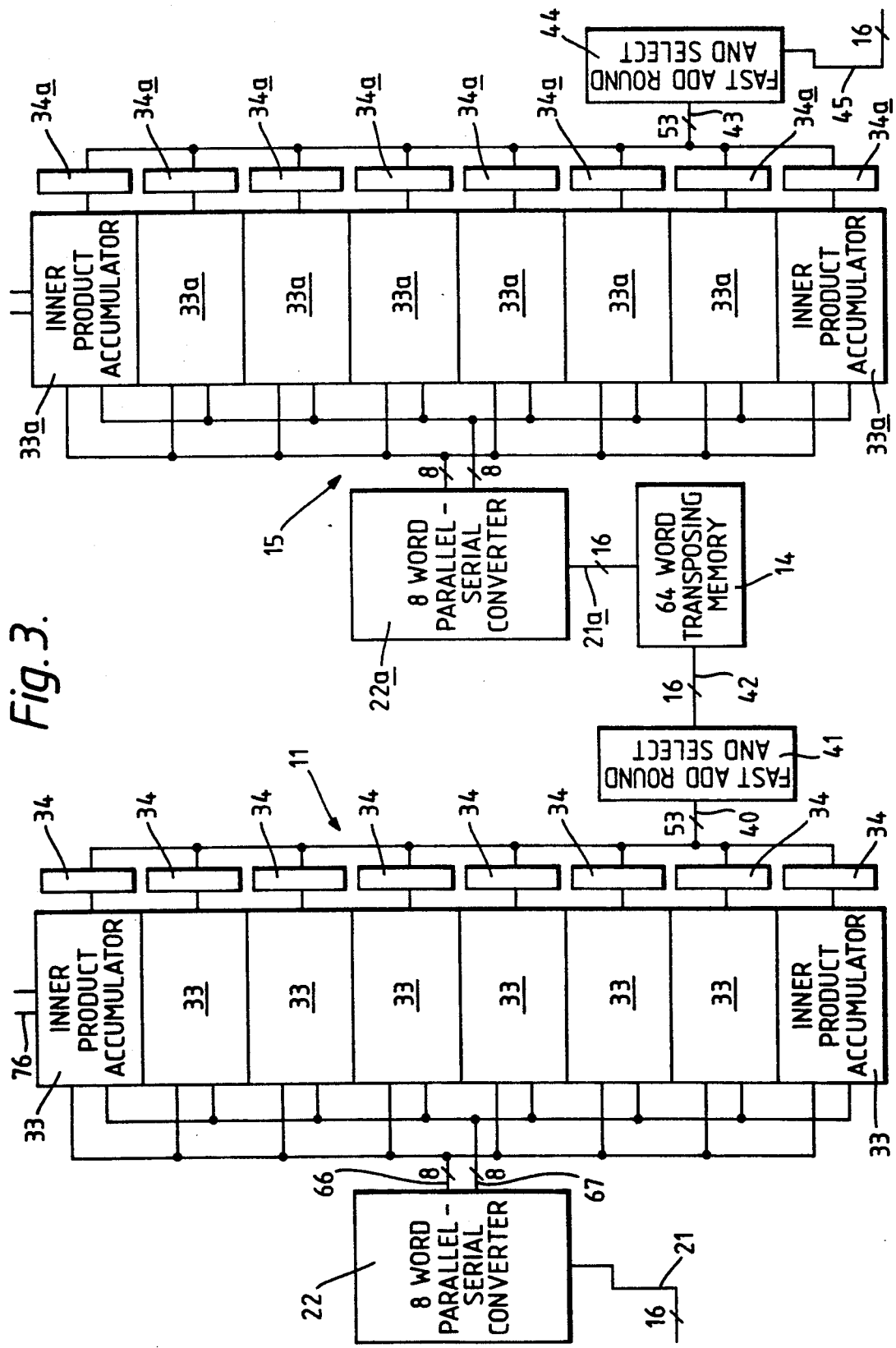
FIG. 3 is a block diagram of an apparatus for implementing the system shown in FIG. 1, in accordance with the invention.

FIG. 3 shows in more detail the implementation of the present example for carrying out the system shown in FIG. 1. Two identical signal processing units 11 and 15 are used to carry out successive one dimensional transforms. The processing units 11 and 15 are coupled together as a linear pipeline. Processing unit 11 has a parallel-serial converter 22 at its input followed by eight inner product accumulators 33 and eight registers 34 providing an output 40 to an add/round and select circuit 41. The output 42 of circuit 41 is supplied to the transposer 14 which provides an input 21a to a further parallel-serial converter 22a forming an input to the second processing unit 15. The second processing unit 15 has the same circuitry as processing unit 11 and similar parts have been marked with the same reference numeral having the suffix a. The output 43 from the processing unit 15 is fed to a further add/round and select circuit 44 similar to circuit 41. This provides an output on bus 45 representing the two dimensional linear transformation. As the processing units 11 and 15 have the same construction the following description will relate to the one processing unit 11 and it will be understood that a similar description applies to processing unit 15. The parallel-serial converter 22 is shown in more detail in FIG. 4. The inner product accumulator of processor 11 which is provided by ROMs 24 and accumulators 27 is shown in more detail in FIGS. 5 and 6 and the add/round and select unit 41 is shown in more detail in FIG. 7.

Figure 4:
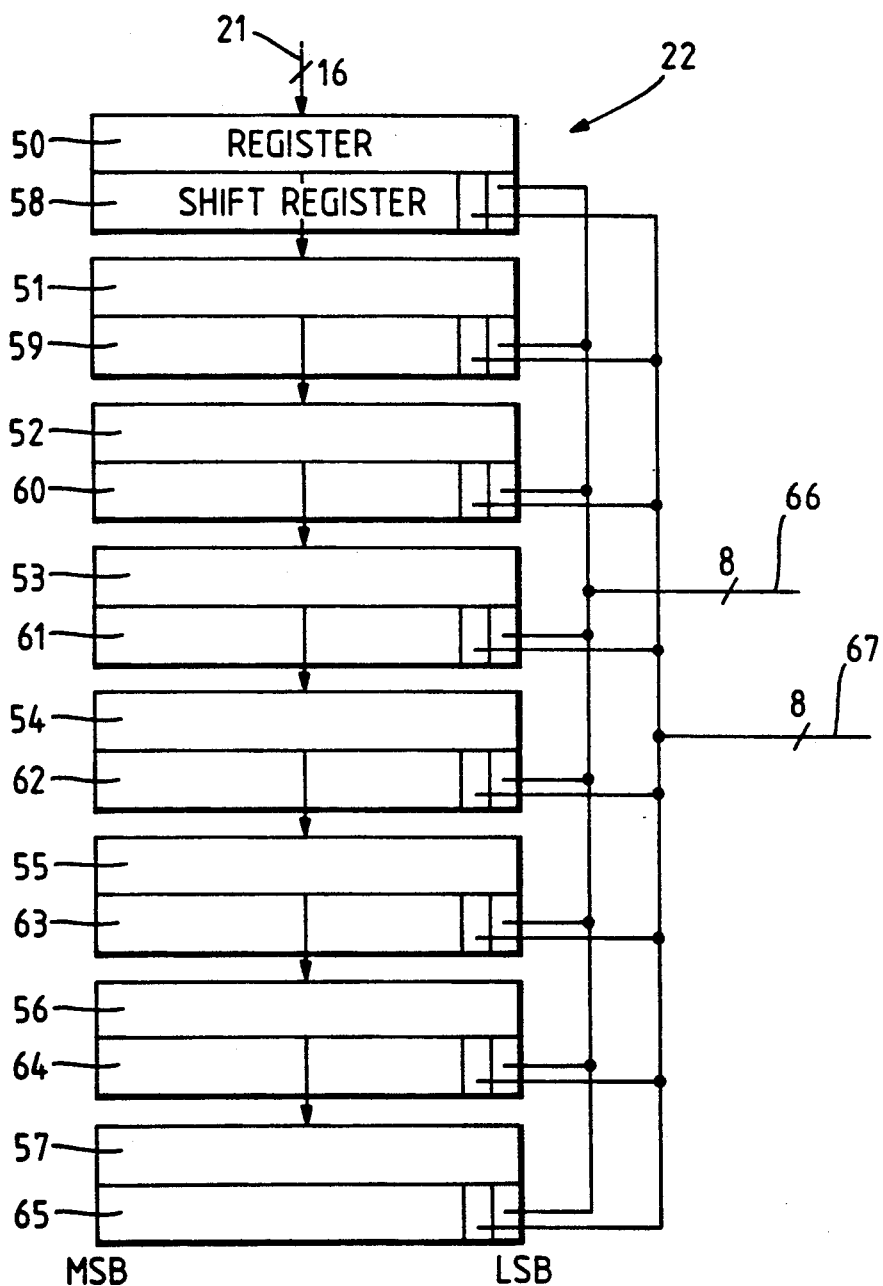
FIG. 4 shows a register system for use in FIG. 3.

As already explained, data is fed word by word representing elements of a row or column of a matrix along bus 21 into the parallel serial converter 22. Each word in this example is sixteen bits long and the rows and columns of each vector have eight elements. As shown in FIG. 4, the sixteen bits of each word are fed in parallel into a first register 50 and as each successive word arrives the contents of register 50 are advanced to the next register 51 and so on until all eight words have been loaded into eight registers 50–57. In the next cycle of operation the contents of registers 50–57 are transferred into shift registers 58–65 each associatied with a respective one of the registers 50–57. In subsequent cycles the contents of the shift registers 58–65 are output in bit wise fashion two bits at a time starting with the least significant bits. Odd numbered bits are output on line 66 and even numbered bits are output on line 67. This provides two simultaneous bit slices on lines 66 and 67. It will be understood that while the bits of the shift registers are being output in eight successive cycles registers 50–57 are being reloaded with new data words so that the process is continuous.

Figure 5:
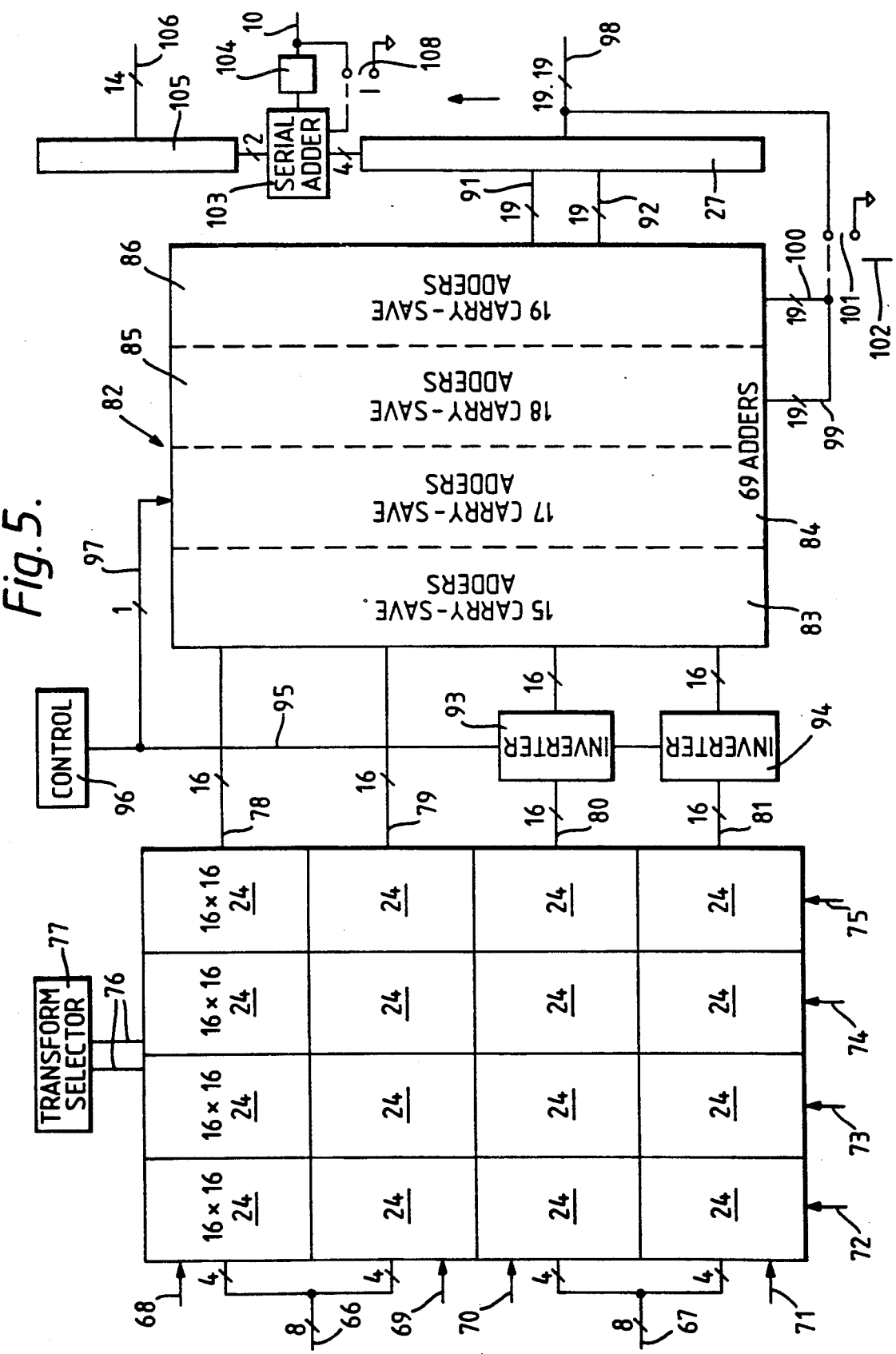
FIG. 5 is a block diagram of part of the apparatus shown in FIG. 3.
Figure 6:
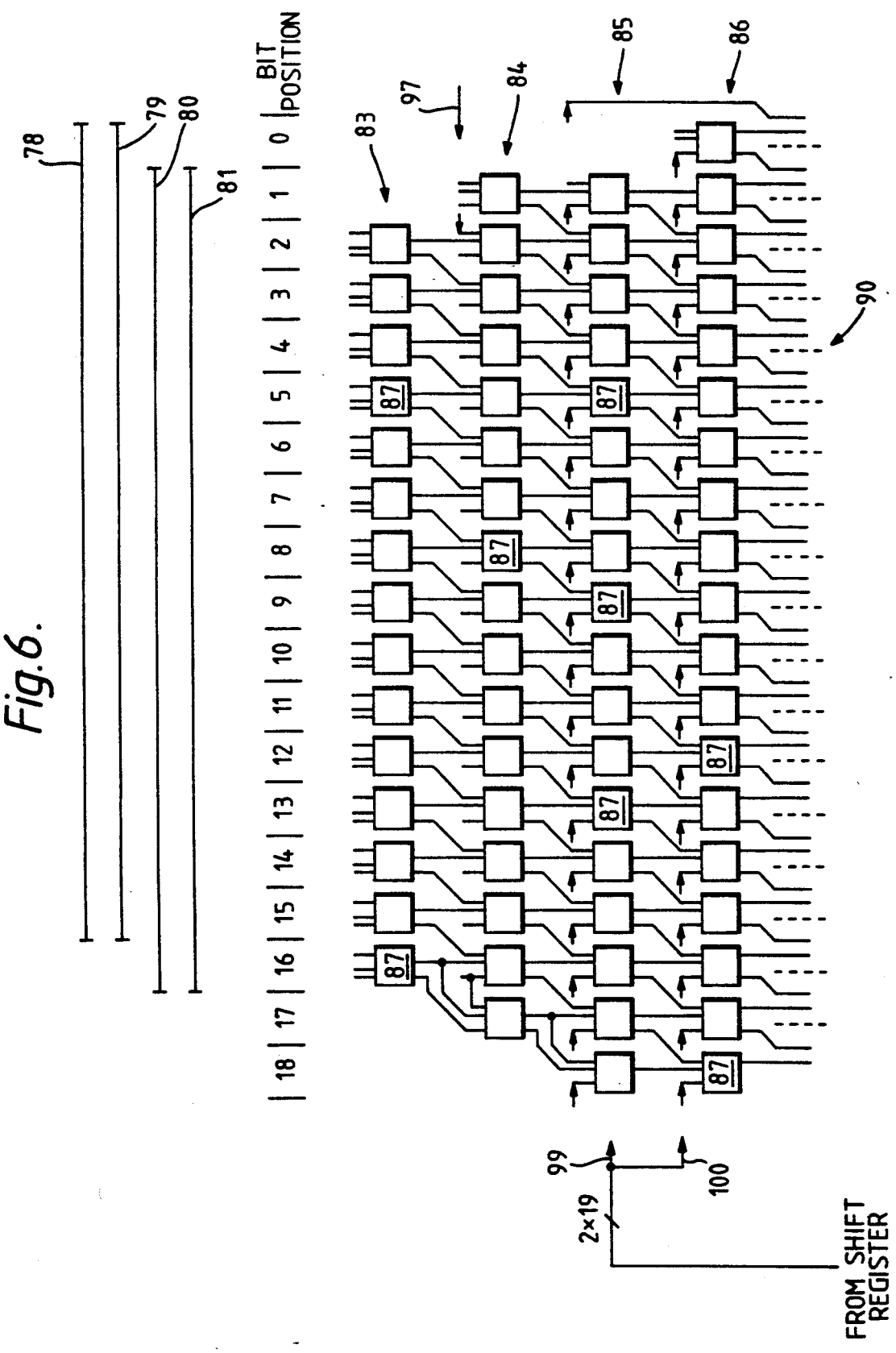
FIG. 6 shows an adder network for use in FIG. 5.

As shown in FIG. 3, processor 11 has eight similar inner product accumulators 33 one of which is shown in more detail in FIG. 5. Lines 66 and 67 are each connected to each of the inner product accumulators 33. As shown in FIG. 5, each of the input buses 66 and 67 is separated into two four bit signals and this reduces the ROM size necessary for the memories 24. Each of the four bit signals is supplied to a respective one of four rows 68, 69, 70 and 71 each row having four ROMs 24. The ROMs 24 are arranged in four banks 72, 73, 74 and 75 each bank corresponding to a different transform. Each of the memories 24 contains pre-computed combinations of transform coefficients depending on which of the four transforms discrete cosine transform, inverse discrete cosine transform, low pass filter or identity is to be performed. A transform selector 77 is provided which outputs signals on line 76 to couple the inputs from line 66 and 67 to the bank of ROMs 24 related to the selected transform. The non-selected ROMs are inoperative. The precomputed combinations from the ROMs 24 corresponding to the locations addressed by signals on the inputs 66 and 67 are output on lines 78, 79, 80 and 81 each of which consists of a sixteen bit bus. The outputs are summed by a bank of adders 82 consisting of a first stage of fifteen carry save adders 83 a second stage of seventeen carry save adders 84 a third stage of eighteen carry save adders 85 and a fourth stage 86 consisting of nineteen carry save adders. As is shown in FIG. 6, the adder network comprises an array of full adders 87 each having three inputs and both sum and carry outputs. Each of the inputs on lines 78–81 is a sixteen bit input and the connection of these inputs with the stages of the adders is indicated in FIG. 6. Some are connected to stage 1, some to stage 2, 1 to stage 3 and 2 to stage 4 as shown. The output signals 90 from the last stage 86 of adders are provided on two nineteen bit buses 91 and 92 to the accumulator 27.

The outputs from the ROMs 24 are in two's complement format and consequently it is necessary to invert and thereby make negative signals on lines 80 and 81 corresponding to the most significant bit slice from the shift registers 58-65. These will occur on line 67 as this provides slices for even numbered bits. When the data on lines 80 and 81 corresponds to the most significant bit, the signals are inverted by inverters 93 and 94 in lines 80 and 81 respectively. The inverters 93 and 94 are activated by a signal on line 95 from a control unit 96 responsive to the most significant and least significant slices. In addition to inverting signals on lines 80 and 81 it is necessary for the inversion to add 1 in the least significant position and this is done by a signal on line 97 from the control unit 96. As it is necessary to add 1 for each of the invertions on lines 80 and 81 a single 1 is added into the bit 2 position as shown at 97 in FIG. 6 and this addition into the bit 2 position has the same effect as adding one twice in the bit 1 position. When adding two numbers of unequal bit length in two's complement it is necessary to repeat the most significant bit of the shorter number for each of the remaining bit positions of the longer number. From FIG. 6 it can be seen that in stage 84 an input to bit 16 is also input to bit 17 and similarly for bits 17 and 18 in stage 85.

The accumulator 27 provides two nineteen bit output signals on line 98 and this output is also fed back on lines 99 and 100 to stages 85 and 86 respectively of the adder array. A switch 101 is arranged to supply zeros on lines 99 and 100 in response to a signal from control unit 96 on a line 102 indicating that the data corresponds to the least significant slice. In this way the least significant slice does not have added data corresponding to a previous block of data. For all other conditions the switch 101 allows the feedback from line 98 through lines 99 and 100 to the adder network. The register 27 is a four bit shift shift register so that in each cycle of operation it shifts four bits towards the least significant position. These four bits are fed through a serial adder 103 for resolving the carry signals on the four bits shifted. A one bit register 104 is provided to store any carry bit from the adder 103. The result output of the adder 103 is fed to a register 105 from which a fourteen bit output is provided on line 106. Any carry signal from the register 104 is provided on line 107. A switch 108 similar to switch 101 is provided to respond to a signal from the control unit 96 indicating that the data corresponds to the least significant slice so as to supply a zero in the carry signal to the serial adder 103 at the beginning of data corresponding to each new block of data. The output on lines 106, 107 and 98 from each of the inner product accumulators 33 is held in a respective 53 bit register 34 as shown in FIG. 3.

Figure 7:
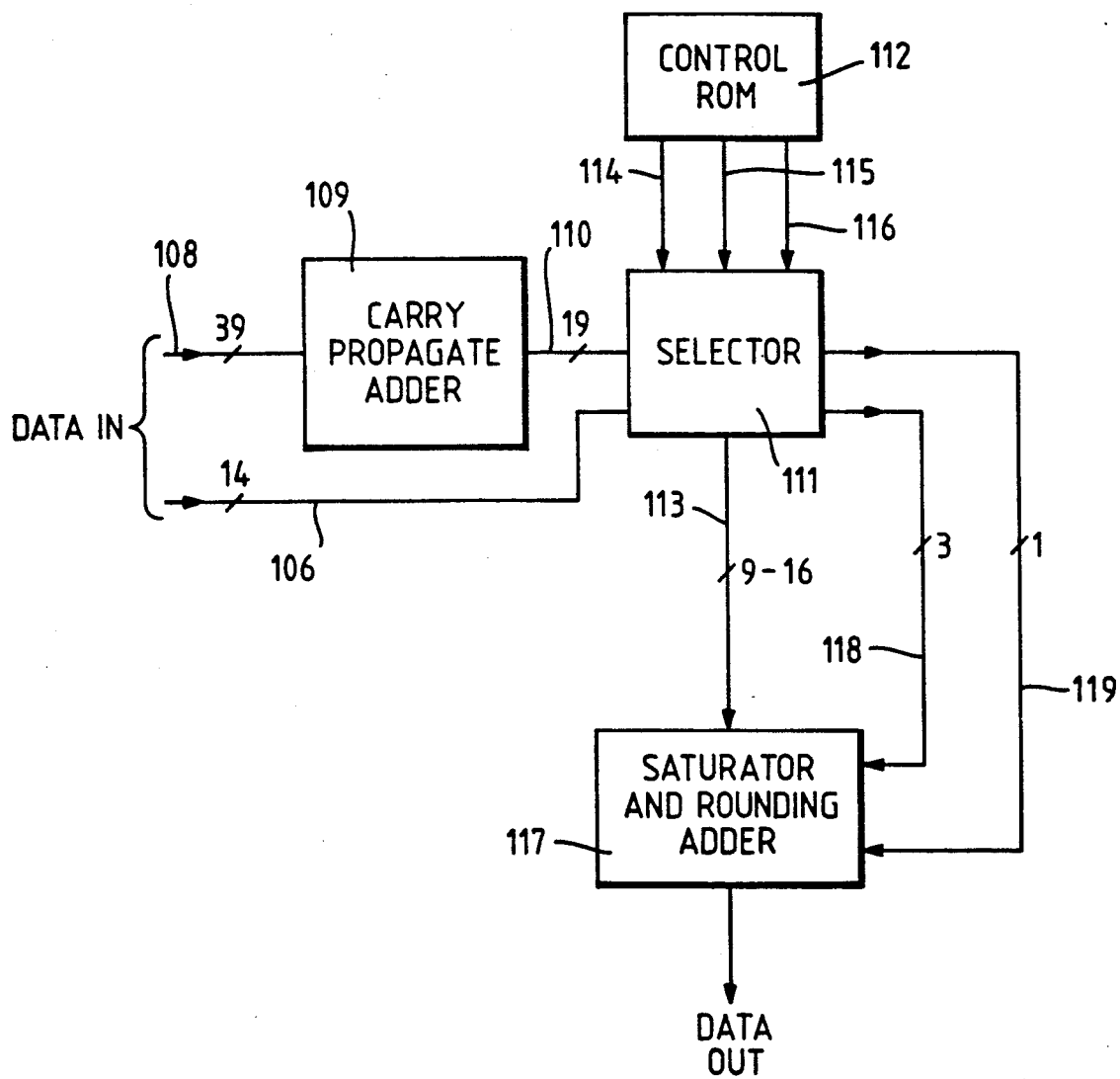
FIG. 7 shows a further part of the apparatus of FIG. 3.

It will be appreciated that the use of an adder network having carry save adders 87 avoids the need for carry propagate adders in every inner product accumulator. Some simplification is achieved in each inner product accumulator by use of the serial adder 103 which reduces the bits of lower significance into normal binary form as the shifts by register 27 are effected. The outputs from registers 34 are fed on line 40 to the circuit 41 which is shown in more detail in FIG. 7. In FIG. 7 the outputs from lines 98 and 107 in FIG. 5 form an input 108 to a carry propagate adder 109. This is of conventional design and reduces the 39 input bits to an output of nineteen bits on lines 110 which is fed to a selector 111. The output 106 from register 105 in FIG. 5 is fed directly to the selector 111. The selector is programmed by use of a control ROM 112 to route any contiguous row of 9 to 16 of the 33 input bits to a sixteen bit output on line 113. If less than sixteen bits are selected one or more of the lower order bits are set to zero. The selector 111 receives three programmed inputs from the control ROM 112 on lines 114, 115 and 116. These correspond respectively to a five bit signal on line 114 defining the top bit of the word selected. The input on line 115 is a three bit signal defining the width of the output word. Signal on line 116 gives a signed saturation signal to the selector 111. Data is output from the selector on line 113 to a saturator and rounding adder 117. This also receives control signals on lines 118 and 119 from the selector 111. There is an overflow condition if the most significant bits rejected are not all 1 or 0. The rounding condition is set when the least significant discarded bits have the pattern 100 .... If there is a 011 ... pattern in the output word then a maximum integer condition is detected. Three saturation control output signals are generated by the selector and supplied on line 118 whereas the rounding signal is provided on line 119. On line 118 a "satpos" signal is set if there is an overflow and the input word is positive. The condition "satneg" is set if an overflow is detected and the input number is negative and if the input "signed saturation" on line 116 is set. The condition "satzero" is set if the input number is negative and the "signed saturation" signal is not set on lines 116. A rounding bit is set on line 119 if the rounding condition is detected, the output does not represent the maximum integer, there is no overflow and saturation to zero is not being generated.

The control ROM 112, control unit 96 and transform selector 77 may form part of a common control unit.

Figure 8:
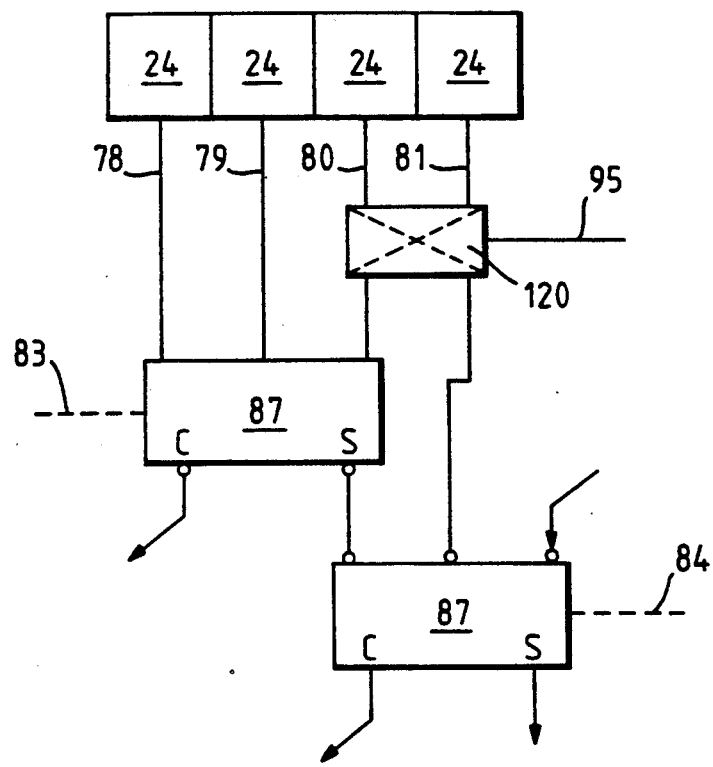
FIG. 8 shows an inverter arrangement for use in FIGS. 5 and 6.
Figure 9:
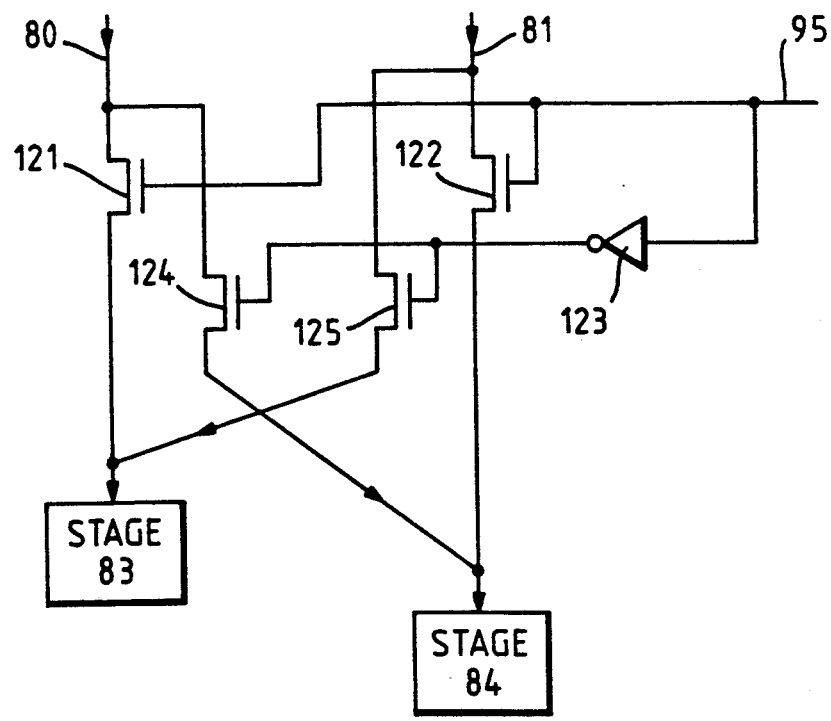
FIG. 9 is a circuit diagram of one implementation for use in FIG. 8

The invertor circuits 93 and 94 are shown in more detail in FIGS. 8 and 9. FIG. 8 illustrates the output from the memories 24 on lines 78-81 at for example bit position 15 shown in FIG. 6. This indicates that the signals on lines 78 and 79 are supplied directly to adder 87 in stage 83. The signal on line 80 is fed to the adder in stage 83 through a cross-over switch 120 forming part of the inverter circuitry 93 and 94. The signal on line 81 is normally supplied through the switch 120 to the adder 87 in stage 84. In order to invert signals 80 and 81 when the most significant slice signal is received on line 95 the switch 120 is switched over so that the signal on line 80 is supplied to the adder in stage 84 and the signal on line 81 is supplied to the adder in stage 83. This has the effect of forming the negative of both signals on lines 80 and 81. As already explained, the circuitry used in this embodiment is CMOS circuitry and the adders 87 used in this example all cause inversion of the output signals relative to the input signals. For this reason the signals which are normally supplied directly to the second stage 84 of adders are stored inverted in the memories 24 whereas the signals fed directly to the adders in the first stage 83 are not inverted in the memories 24.

The conventional manner of effecting inversion to negate signals has involved putting an exclusive OR gate in the signal line where inversion is required. To form the negative of the signals on lines 80 and 81 would therefore require by conventional circuitry two exclusive OR gates and in CMOS technology each OR gate would normally require six transistors thereby requiring twelve transistors for each pair of lines 80 and 81. By use of the cross-over switch 120 in place of exclusive OR gates the circuitry may be considerably simplified as shown in FIG. 9. In this example, line 80 includes a transistor 121 for supplying the signal to the adder in stage 83 when inversion is not required and line 81 includes a similar transistor 122 to allow supply of signal to the adder 87 in stage 84 when inversion is not required. The gates of transistors 121 and 122 are each connected to the control line 95 from the control unit 96. The circuit includes two cross-over transistors 124 and 125 whose gates are connected through an inverter 123 to the control line 95. When the signal on line 95 indicates that the data corresponds to the most significant slice, transistors 121 and 122 are turned off and transistors 124 and 125 are turned on. In this state the signal on line 80 is connected to the adder in stage 84 and the signal on line 81 is connected to the adder in stage 83. The connections are reversed when the signal on line 95 reverts to a normal state not indicating that the data corresponds to the most significant slice. It will therefore be seen that by use of the circuit in FIG. 9 the inversion of signals on two lines in the adder array previously described is achieved by use of only four transistors rather than twelve transistors needed with exclusive OR gates. It will be appreciated that the circuit described in FIGS. 8 and 9 is repeated for each of the sixteen bit positions on the signal outputs for lines 80 and 81 thereby resulting in a considerable reduction in the number of transistors required. This provides substantial benefits in the space required on the chips needed for the circuitry together with reduction in cost and power dissipation.

As already described, the above example operates as a single pipeline in which data flows in continuously word by word and the transform data flows out at the same rate at a fixed number of clock cycles later. As shown in FIG. 10 the pipeline consists of a sequential connection of a first serial/parallel converter 22, a first set of inner product accumulators 33, and first add-/round and selector 41, a transposer 14, a second serial/parallel converter 22, a second set of inner product accumulators 33 and a second add/round and selector 41. The pipeline is controlled by a control unit 125 which includes the transform selector 77 control unit 96 and control ROM 112. The control 125 consists of two shift registers 126 and 127 for each of the units 22, 33, 41 and 14 in the pipeline and each of the shift registers 126 and 127 requires the same number of clock cycles for passage of signals through those registers as the associated units 22, 33, 41 and 14 require for processing of data through those units. The control of all circuitry is in accordance with clock pulses from a clock 128. To start processing a first 64 element block of data, a GO signal is supplied to register 126 associated with the parallel/serial converter 22 and a selection signal determining the type of transform to be effected is supplied to the beginning of the shift register 127 associated with the parallel/serial converter 22. The GO and selection signals are shifted sequentially along the shift registers 126 and 127 in the pipeline in synchronism with each other. After eight cycles a signal is supplied on line 130 to the parallel serial converter 22 to indicate that data can now be shifted out to the inner product accumulator 33 which on the next cycle is reset by a signal on line 131 and has the transform type selected by a signal on line 76. After the required number of clock cycles by the inner product accumulator 33 the GO and select signals will have entered the next shift registers corresponding to unit 41. This again will provide a reset signal on line 132 and selection signals on lines 114–116. After the number of cycles required by unit 41 GO and select signals in the shift registers 126 and 127 will reset the transposer 14. This consists of two sixtyfour word memories which is reset when the GO signal arrives and writing to the first memory starts at the first location in the memory. The data is subsequently read out orthogonally in order to make the transposition. When in continuous use data is read out from one memory while data is being written into the other. The data is subsequently passed through the second set of units 22, 33 and 41 and similarly controlled by the passage of the GO and select signals through the clock controlled shift registers 126 and 127. As can be seen from FIG. 10, the pipeline is long enough to have parts of three blocks of data in the pipeline simultaneously. In the case shown in FIG. 10 data from block i+2 is being loaded into the parallel serial converter 22 while data from block i+1 is being processed in the first set of inner product accumulators 33, unit 41 and transposer 14. At the same time data from block i is being read out of the transposer 14 and processed by the second set of units 22, 33 and 41.

It will therefore be seen that the chip used for implementing the above described circuitry may be carrying out two different transforms simultaneously (that is on the second part of one block of data and on the first part of a subsequent block of data). The two transforms on the two blocks of data need not be the same. Similarly the two transforms carried out on a single block of data need not necessarily be the same. By selecting the identity transform for the second processing unit, the chip may carry out a 1D transform. When used to carry out discrete cosine transforms, inverse discrete cosine transforms and low pass filter transforms the apparatus may be used for image compression purposes in transmitting or storing video signals.

The invention is not limited to the details of the foregoing examples.

We claim:

1. Digital signal processing circuitry comprising first and second processors each for effecting a linear transform on respective blocks of digital data, each of said processors including transform variation circuitry for varying the linear transform effected by the respective processor, said first and second processors being coupled as a linear pipeline by means of pipeline circuitry, said pipeline circuitry including timing controlled circuitry arranged to control the transmission of a succession of blocks of digital data through each of said first and second processors in succession to effect a combined transform, and selection circuitry coupled to the transform variation circuitry of each of said first and second processors and arranged to select the linear transform effected by the respective processor independently of the selection of linear transform of the other processor, whereby the combined transform to be performed on each block of data by the digital signal processing circuitry is selectable independently of the combined transform to be performed on a successive block of data.

2. Digital signal processing circuitry according to claim 1 in which each processor includes a bank of carry save adders to effect multiplication of transform coefficients by repeated addition to form a plurality of inner products each addition corresponding to one bit position of a data word in said blocks of data.

3. Digital signal processing circuitry according to claim 2 in which a carry propagate adder is provided in said pipeline after said bank of carry save adders of said first processor whereby carry signals are resolved before transform data is supplied to said second processor.

4. Digital signal processing circuitry according to claim 3 in which a carry propagate adder is provided in said pipeline after said bank of carry save adders in said second processor.

5. Digital signal processing circuitry according to claim 1 in which each of said first and second processors comprise substantially the same circuitry.

6. Digital signal processing circuitry according to claim 1 in which each of said processors includes a memory having pre-computed combinations of transform coefficients, memory addressing circuitry to address said memory in accordance with data in said blocks of digital data and accumulator circuitry to accumulate data from said memory in response to successive addressing of the memory.

7. Digital signal processing circuitry according to claim 6 in which each processor includes storage circuitry for storing data words forming a row or column of data from each of said blocks and supplying data bitwise from each of said words to said address in circuitry.

8. Digital signal processing circuitry according to claim 1 in which said first and second processors are implemented in CMOS circuitry.

9. Digital signal processing circuitry according to claim 1 in which each bank of adders operates in two's complement format and inverter circuitry is provided to invert data from said first processor corresponding to the most significant bits of data supplied from each word.

10. Digital signal processing circuitry according to claim 9 including an adder array comprising a plurality of adders performing a succession of adder stages wherein each adder is arranged to invert its output relative to its input and said inverter circuitry comprises a cross-over switch arranged to interchange two signals fed to respective successive stages of the adder array.

11. A method of computing linear transforms on blocks of digital data, said method comprising transmitting blocks of digital data successively through first and second processors each operable to perform a plurality of different selectable linear transforms, controlling flow of data through said first and second processors in a time controlled manner to effect a linear pipeline, selecting a first set of coefficients for use in said first processor, and selecting a second set of coefficients for use in said second processor, the selection of the first and second set of coefficients being independently variable whereby a combined linear transform is computed on each block of data by the first and second processors independently of the combined linear transform computed on a successive block of data.

12. A method according to claim 11 comprising accumulation of a plurality of inner products representing multiplication of input data with a plurality of transform coefficients, said accumulation being effected by operation of carry save adder network.

13. A method according to claim 12 wherein said inner products are obtained by successive addressing of a memory having a plurality of precalculated combinations of transform coefficients.

* * * * *